US012589663B2

(12) United States Patent (10) Patent No.: US 12,589,663 B2
Cameron (45) Date of Patent: Mar. 31, 2026

(54) ROBOTIC ELECTROMAGNETIC ELECTRIC VEHICLE CHARGING SYSTEM

(71) Applicant: D Kevin Cameron, Sunnyvale, CA (US)

(72) Inventor: D Kevin Cameron, Sunnyvale, CA (US)

(73) Assignee: PREZENT ENERGY CORPORATION, Sunnyvale, CA (US)

( * ) Notice: Subject to any disclaimer, the term of this patent is extended or adjusted under 35 U.S.C. 154(b) by 749 days.

(21) Appl. No.: 17/385,903

(22) Filed: Jul. 26, 2021

(65) Prior Publication Data

US 2022/0024328 A1    Jan. 27, 2022

Related U.S. Application Data

(60) Provisional application No. 63/056,597, filed on Jul. 25, 2020.

(51) Int. Cl.
| | |
|---|---|
| *H02J 7/00* | (2006.01) |
| *B60L 53/12* | (2019.01) |
| *H01F 27/24* | (2006.01) |
| *H01F 27/28* | (2006.01) |
| *H02J 50/12* | (2016.01) |
| *H02J 50/40* | (2016.01) |
| *H02J 50/90* | (2016.01) |

(52) U.S. Cl.
CPC .............. *B60L 53/12* (2019.02); *H01F 27/24* (2013.01); *H01F 27/28* (2013.01); *H01F 27/2885* (2013.01); *H02J 7/0013* (2013.01);

*H02J 50/12* (2016.02); *H02J 50/402* (2020.01); *H02J 50/90* (2016.02)

(58) Field of Classification Search
USPC .......................................................... 320/108
See application file for complete search history.

(56) References Cited

U.S. PATENT DOCUMENTS

| | | | |
|---|---|---|---|
| 4,656,412 A | 4/1987 | McLyman | |
| 5,821,731 A * | 10/1998 | Kuki ..................... | H02J 7/0045 |
| | | | 320/108 |
| 2010/0139521 A1* | 6/2010 | Forbes ..................... | B61D 3/18 |
| | | | 105/198 |
| 2010/0148723 A1* | 6/2010 | Cook ...................... | H02J 50/12 |
| | | | 320/108 |

(Continued)

FOREIGN PATENT DOCUMENTS

| | | |
|---|---|---|
| CN | 107 294 217 A | 10/2017 |
| CN | 110 040 014 A | 7/2019 |

OTHER PUBLICATIONS

Extended European Search Report ("EESR") [including: supplementary European search report and the European search opinion], EPO for Appl. No. 21850877.8-1211/4168269; PCT/US2021043254, mail date Jun. 14, 2024 (Jun. 14, 2024); 33 pages.

(Continued)

*Primary Examiner* — Samuel Berhanu

(57) ABSTRACT

A system, method, and apparatus for wirelessly charging a load. A primary transformer coil from an energy source is provided to interface with a load application with a secondary transformer coil. The method of charging is independent of resonance frequency.

26 Claims, 8 Drawing Sheets

(56)          References Cited

U.S. PATENT DOCUMENTS

| | | | | |
|---|---|---|---|---|
| 2011/0074349 A1* | 3/2011 | Ghovanloo | ............. | H02J 50/80 |
| | | | | 320/108 |
| 2013/0038285 A1* | 2/2013 | Hickox | ................... | H02J 50/10 |
| | | | | 320/109 |
| 2016/0023565 A1* | 1/2016 | Bell | ........................ | B60L 53/36 |
| | | | | 320/108 |
| 2016/0028243 A1* | 1/2016 | Schatz | .................... | H02J 50/12 |
| | | | | 307/104 |
| 2016/0059723 A1* | 3/2016 | Kim | ........................ | B60L 53/39 |
| | | | | 320/108 |
| 2016/0101701 A1* | 4/2016 | Wu | ........................ | B60L 53/38 |
| | | | | 320/108 |
| 2017/0225574 A1* | 8/2017 | Thelen | .................... | B60L 53/30 |
| 2018/0026482 A1* | 1/2018 | Asano | ....................... | H02J 7/00 |
| | | | | 307/104 |
| 2018/0272875 A1* | 9/2018 | Fontana | .................. | G06F 21/44 |
| 2019/0039464 A1 | 2/2019 | Greifelt et al. | | |
| 2019/0097448 A1* | 3/2019 | Partovi | ................... | B60L 53/12 |
| 2019/0333676 A1* | 10/2019 | Shin | ....................... | H01F 38/14 |

OTHER PUBLICATIONS

Murat Yilmaz et al: "Review of Battery Charger Topologies, Charging Power Levels, and Infrastructure for Plug-In Electric and Hybrid Vehicles", IEEE Transactions on Power Electronics, vol. 28, No. 5, May 1, 2013 (May 1, 2013), pp. 2151-2169, XP055096133, ISSN: 0885-8993, DOI: 10.1109/TPEL.2012.2212917.

* cited by examiner

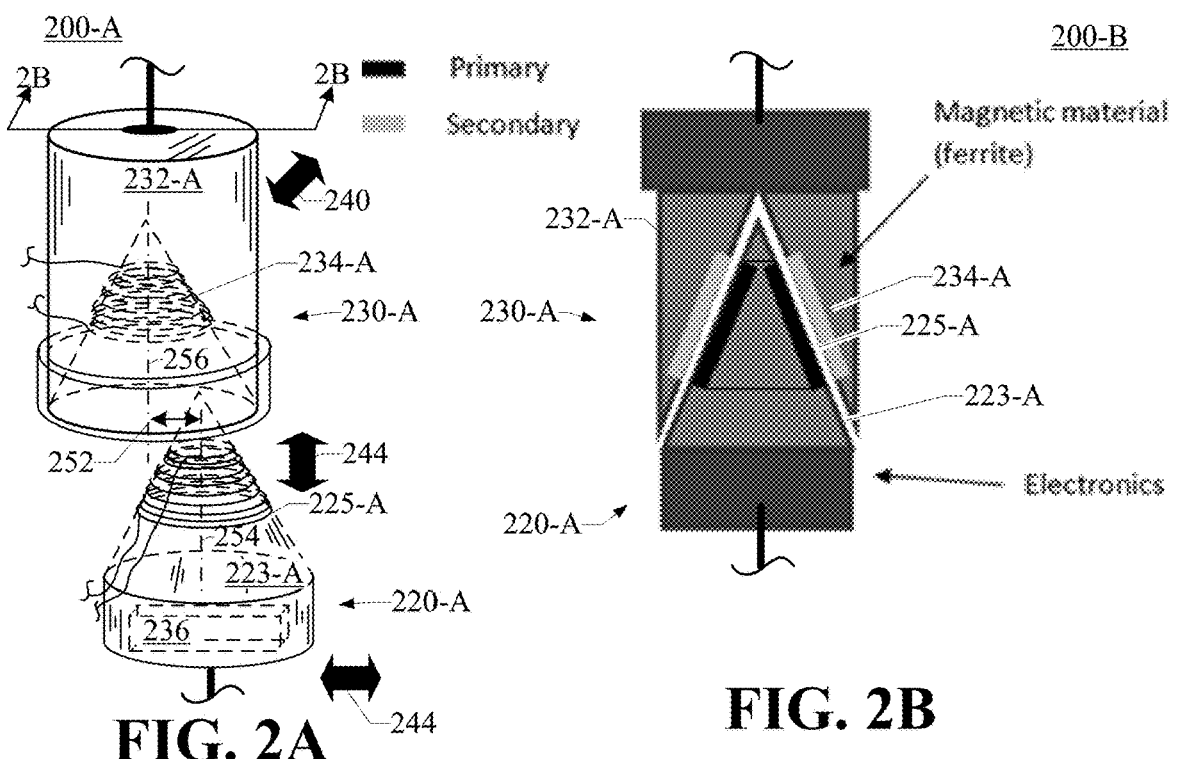
FIG. 2A
FIG. 2B
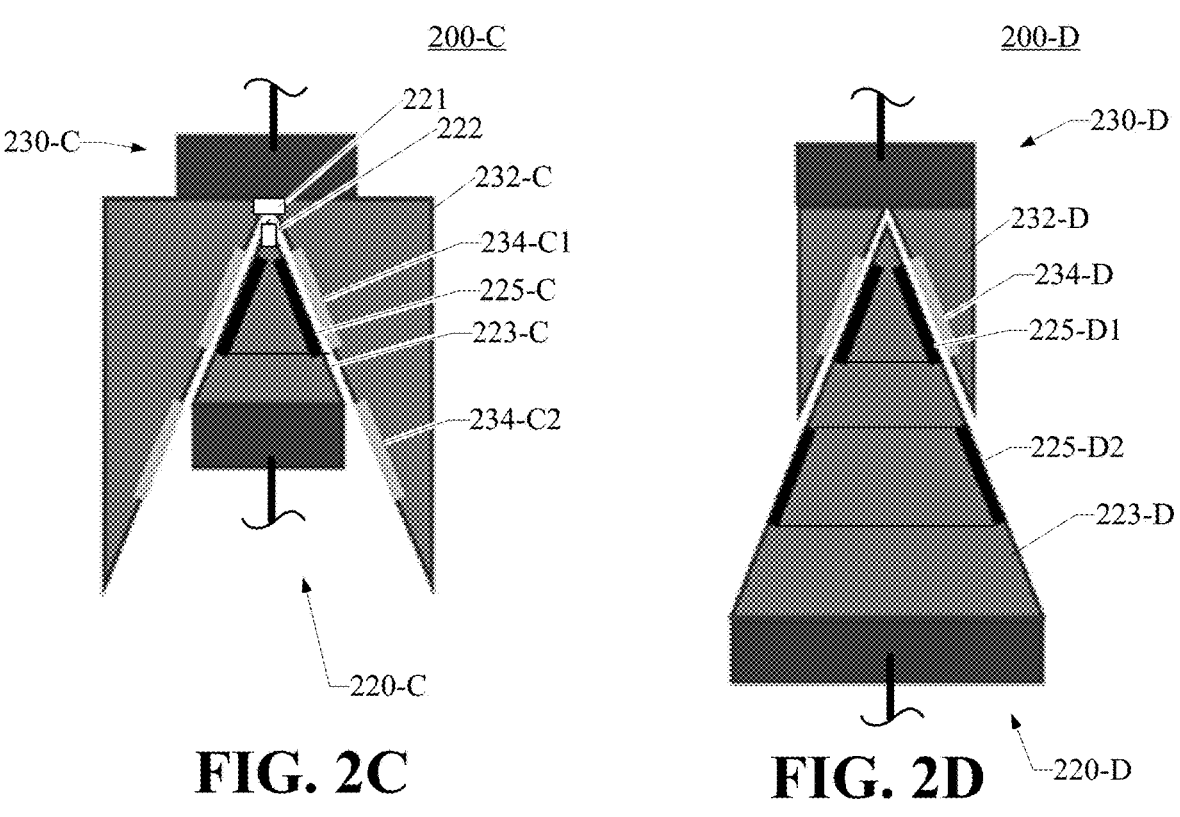
FIG. 2C
FIG. 2D

300-A

300-B

600-A

ROBOTIC ELECTROMAGNETIC ELECTRIC VEHICLE CHARGING SYSTEM

CROSS-REFERENCE TO RELATED APPLICATIONS

This application claims priority to provisional application(s): Ser. No. 63/056,597 filed 25 Jul. 2020, titled "ROBOTIC ELECTROMAGNETIC ELECTRIC VEHICLE CHARGING SYSTEM", by D. Kevin Cameron, the disclosure of all of said application(s) is/are incorporated by reference herein in their entirety. Where a definition or use of a term in a reference, which is incorporated by reference herein, is inconsistent or contrary to the definition of that term provided herein, the definition of that term provided herein applies and the definition of that term in the reference does not apply.

FIELD OF TECHNOLOGY

This disclosure relates generally to the technical fields of electrical charging, and in one example embodiment, this disclosure relates to a method, apparatus and system of selectively charging electric vehicles (EVs).

BACKGROUND

EVs are proliferating and are in constant need to be recharged regularly, and as quickly as possible. While fast charging a (small) car is not too difficult a problem, larger vehicles with bigger batteries, higher energy capacity, can be problematic for both power electronics capability and for load capacity of the power grid. Specifically, the limits of residential housing and light commercial offices wiring is usually in the region of 100s of kWs, while fast charging a truck or bus will likely require megawatts (MWs) of power.

Developing a common standard for connectors is difficult, since passenger cars do not need as large a power supply as industrial trucks need. Thus, the type of plug will most likely be different for the different power levels of the different applications. However, it is worthwhile to ask whether a single power connection system can be developed for all cases, including both low power passenger vehicles and high-power trucks.

A Society of Automotive Engineers (SAE) style manual plug can be an expensive and impractical plug. Engaging and disengaging a prong-style plug can lead to damage to the prongs and interfacing equipment resulting from a misalignment or excessive force to attempt a full engagement of the plug. This can lead to a heavy and awkward plug and socket designs that are difficult for some humans to handle.

Furthermore, the limited availability of fast-chargers requires drivers to move their cars immediately after charging to open a charging opportunity for newly arriving EVs. This leads to congestion and potentially uncharged and stranded EVs or in some cases employing valet parking attendants to do the shuffling of cars.

There are two basic types of wireless charging; one is close-proximity tightly-coupled (as in switch mode power supply (SMPS) transformers), and the other is resonant which works with larger separation. Close proximity between a charging and receiving coils, typically less than a millimeter, yields efficiency above 95%. Resonant wireless charging systems, on the other hand, can accommodate a more generous and convenient distance between a charging and receiving coils, such as tens of centimeters, which is three orders of magnitude greater than in transformers, but efficiency can drop to approximately 15-40%. Also, circuit complexity increases to accommodate a distributed resistance, inductance, and capacitance (RLC) matching between the charging and receiving coils that 'tunnels' energy therebetween, rather than radiating an electromagnetic field omnidirectionally as for the inductive application. In a building where many vehicles are being charged using resonant wireless systems the leaked power could cause serious heating issues that will weaken reinforced concrete.

The inductively or magnetically coupled charging system for an EV will wirelessly induce a voltage, i.e., an electromotive force or EMF, across the ends of a receiver wire, or secondary circuit, when a nearby charging wire, or primary circuit, that is not directly connected thereto (i.e., not conductively coupled), has a change in current. This is referred to as electromagnetic induction because the charging circuit creates a changing magnetic field, or flux, around it, per Ampere's circuital law. This in turn induces a voltage in the receiving circuit by Faraday's law of induction.

The inductive coupling, or mutual inductance, between two wires, or circuits, can be increased by winding them into coils and placing them close together on a common axis, so the magnetic field of one coil passes through the other coil. Coupling can also be increased by a magnetic core of a ferromagnetic material like iron or ferrite in the coils, which increases the magnetic flux. A transformer physically houses the two coils, aka the primary and secondary windings, in a single unit. The best coupling is achieved by wrapping the windings together (e.g. as a twisted pair of wires), but since that usually doesn't meet isolation requirements windings are made coaxial with mechanical separation (which may be an earth shield).

One type of wireless charging is (mechanically) uncoupled, or resonant, inductive charging (MC). It is used in some wireless inductive charging applications, and it requires a controlled and matched operating frequency between a primary coil (power source) and a secondary (load bearing) coil. The primary and secondary coils are usually located within a fraction of a wavelength to each other. Inefficiency of overcoupling occurs when the primary and secondary coils are too close, and loose coupling occurs when the primary and secondary coils are too far apart. Thus, MC could have location hypersensitivity for efficient charging. A slight misallocation could result in undercharging and customer dissatisfaction, as well as unnecessary overheating and reliability compromises. One MC configuration uses a flat pad. If a flat pad is used as an interface between wireless charging, then foreign object interference (FOI) can interrupt the charging efficiency. Foreign objects can include dirt, grease, rocks and asphalt, road salt, leaves, and other natural road debris as well as unintentionally placed objects such as tools, personal effects, equipment, etc.

Overall, wireless charging of EVs is an area ripe for innovation to longstanding but unmet needs. Skepticism of experts and other factors have dampened promising non-obvious innovations such as the present disclosure.

BRIEF DESCRIPTION OF THE VIEW OF DRAWINGS

Example embodiments are described by way of illustrations and are not limited by the figures of the accompanying drawings, wherein:

FIG. 2A is an isometric view of a matched primary and secondary coil wireless charging transformer, according to one or more embodiments.

FIG. 2B is a cross-section view of a matched nominal-energy primary and secondary coil wireless charging transformer, according to one or more embodiments.

FIG. 2C is a cross-section view of an undersized primary coil and an oversized secondary coil wireless charging transformer, according to one or more embodiments.

FIG. 2D is a cross-section view of an oversized primary coil and an undersized secondary coil wireless charging transformer, according to one or more embodiments.

Figure 1A:
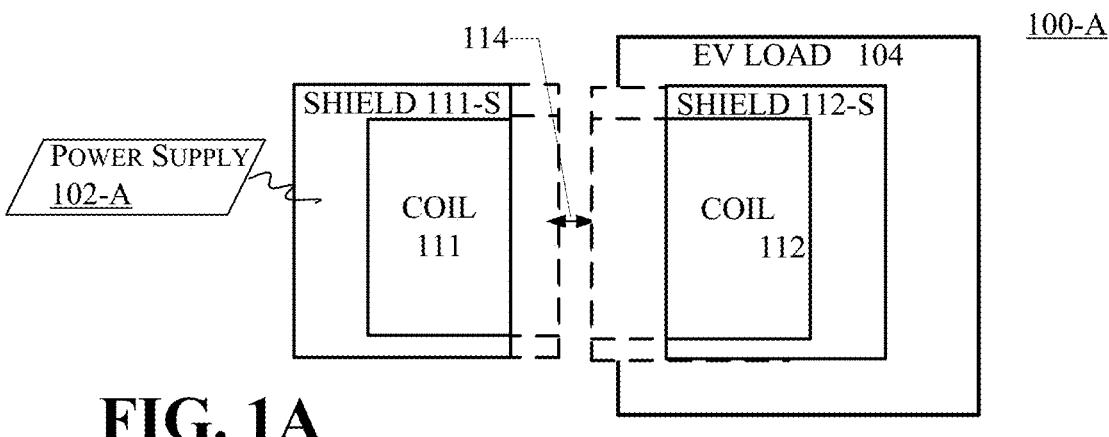
FIG. 1A is a functional block diagram of a wireless charging transformer, according to one or more embodiments.

The drawings referred to in this description should be understood as not being drawn to scale, except if specifically noted, in order to show more clearly the details of the present disclosure. Same reference numbers in the drawings indicate like elements throughout the several views. Other features and advantages of the present disclosure will be apparent from accompanying drawings and from the detailed description that follows.

SUMMARY

A system, method, and apparatus for wirelessly charging a load. A primary transformer coil from an energy source is provided to interface with a load application with a secondary transformer coil. The method of charging is independent of resonance frequency.

The methods, operations, processes, systems, and apparatuses disclosed herein may be implemented in any means for achieving various aspects, and may be executed in a form of a machine-readable medium, and/or a machine accessible medium, embodying a set of instructions that, when executed by a machine or a data processing system (e.g., a computer system), in one or more different sequences, cause the machine to perform any of the operations disclosed herein. Other features will be apparent from the accompanying drawings and from the detailed description that follows. Accordingly, the specification and drawings are to be regarded in an illustrative rather than a restrictive sense. The present invention is defined by the features of the appended claims.

This summary is provided to introduce a selection of concepts in a simplified form that are further described below in the detailed description section. This summary is not intended to identify key or essential features of the claimed subject matter, nor is it intended to be used as an aid in determining the scope of the claimed subject matter.

DETAILED DESCRIPTION

A method, apparatus and system for charging EVs across a range of different power levels is disclosed. In the following description, for the purposes of explanation, numerous specific details are set forth in order to provide a thorough understanding of the various embodiments. It will be evident, however to one skilled in the art that various embodiments may be practiced without these specific details.

Referring now to FIG. 1A, a schematic 100-A illustrates the transformer arrangement between a primary coil 111 surrounded by a shield 111-S and supplied by a power supply 102-A, which can be either a coupled power line, or a self-contained energy source such as a battery, a fuel cell, etc. Mating to the primary coil 111 is a secondary coil 112, itself surrounded by a shield 112-S, both of which are disposed in an EV load 104. The less amount of gap 114 between the primary coil 111 and secondary coil 112, the less losses and the more efficient the energy transfer.

In one embodiment, the solution to charging different EVs with different power level requirements is to scale a variable quantity of charging connections. For example, EVs designed to a higher power specification, or requirement, are charged via a higher quantity of nominal voltage charging connections, e.g., arranged in parallel. Usually, a high power EV, such as a large industrial vehicle, utilizes a higher quantity of standard, physically separate, battery packs that can be charged in parallel.

An electromagnetic coupling described in FIG. 1A is used to couple a power source to one or more battery packs by parallel transformer coil interfaces. The electromagnetic coupling is easy to handle robotically and is inexpensive to manufacture. The largest cost is the transformer coils, which are simply wound wire, which does not require sophisticated power electronics to power or control, as would be needed with a resonance frequency matched wireless inductive charging platform. Furthermore, engaging and disengaging an electromagnetic coupling is easier than doing so with a conduction plug, e.g., with pins or blades, which can easily bind, misalign, or be damaged.

Figure 1B:
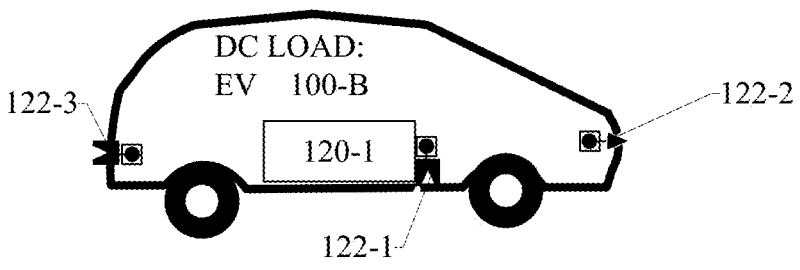
FIG. 1B is an automotive application with a single wireless charging transformer interface, according to one or more embodiments.

Referring now to FIG. 1B, a personal EV van 100-B is shown with a single battery pack 120-1 and a single secondary coil apparatus 122-1. When ready to charge, secondary coil apparatus 122-1 can either remain stationary in place to accept a telescoping primary coil, or can extend down or out to become more accessible to a telescoping or mobile primary coil. Optionally, EV 100-B includes additional primary or secondary coils 122-2 or 122-3, respectively, that can either extendable horizontally or remain stationary to receive a telescoping mating coil, for serial charging via vehicle-to-vehicle (V2V), either stationary or while in motion. For a typical commuter travel range, with available residential overnight parking, a single wireless transformer interface, or connector, should be sufficient to charge the vehicle.

Figure 1C:
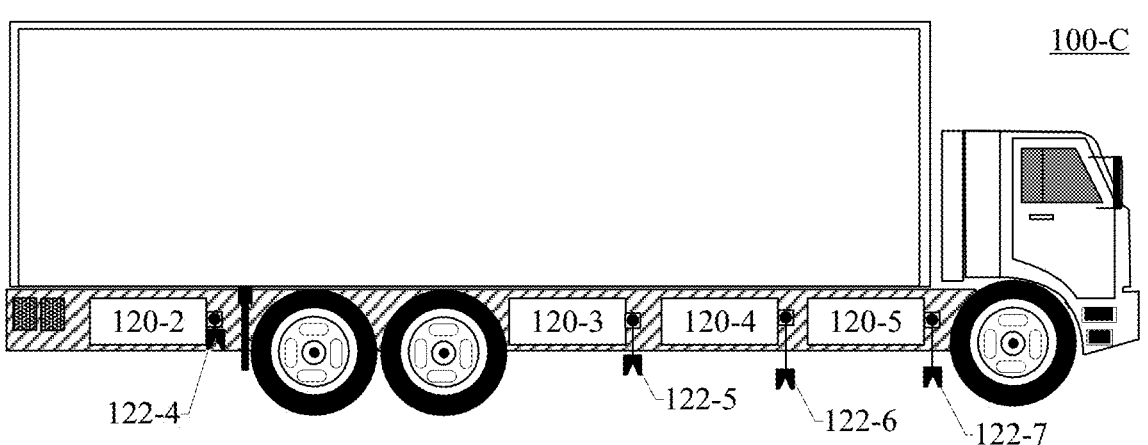
FIG. 1C is an industrial truck application with multiple wireless charging transformer interfaces, according to one or more embodiments.

Referring to FIG. 1C, a box truck is illustrated with multiple standard, physically separate, battery packs 120-2, 120-3, 120-4, and 120-5, each having an equivalent size to that of the personal EV, and each having its own independent secondary coil apparatus 122-2, 122-3, 122-4, and 122-5, respectively, for providing parallel charging to each of the battery packs 120-1, 120-2, 120-3, and 120-4. Battery packs may be wired in series or in parallel. For example, an array of ten 48-volt battery packs is serially coupled to provide 400-500 volt charging level. Each of the ten battery packs can be charge in parallel to each other. This arrangement avoids a serial charging system with the lead battery pack subject to the maximum voltage, which could be more hazardous for a connection blade malfunction, or a separator short. Furthermore, the equipment size is larger, the robustness required is greater, and the cost to manufacture is steeper for a single high-voltage connector than a plurality of lower voltage, smaller size, and less expensive connectors. Additionally, a problem with one of the parallel charging power sources or connectors can be replaced and maintained independently and on the fly without interrupting the charging of the remaining battery packs by their own independent charging units. The present parallel charging system also avoids a connection malfunction in one battery pack from interrupting a charging operation to downstream battery packs. Thus, if an upstream battery pack has an open, the downstream battery packs will still charge in the present embodiment of parallel charging each battery pack independently.

Referring now to FIGS. 2A through 2D, several primary and secondary transformer arrangements are shown, according to one or more embodiments, for providing electromagnetic coupling. A transformer can be made in various shapes. Higher frequency transformer (e.g. 50 kHz and up) efficiency depends mostly on how close the primary and secondary windings are to each other. A ferromagnetic core utilizes a ferrous material suitable for an AC frequency less than 100 Hz in one embodiment, and utilizes a ferrite material suitable for an AC frequency higher than 10 kHz in another embodiment. Extra magnetic material is utilized to reduce leakage currents in another embodiment. If a high level of isolation is not required in one embodiment, then a primary could be wound on top of the secondary.

Referring now specifically to FIG. 2A, an isometric view is shown of a matched primary and secondary coil wireless charging transformer, according to one or more embodiments. Cross-section 2B-2B is shown in FIG. 2B, with FIGS. 2C-2D illustrating similar cross-sectional views, albeit with different sized conical plug or conical socket.

Still referring to FIG. 2A, the present embodiment for robotic charging utilizes a selectively engaging assembly 200-A that includes a conical plug 220-A (male) and a mating conical socket 230-A (female). Conical plug 220-A has a primary winding 225-A having a conical shape disposed around an internal conical core 223-A. Mating conical socket 230-A has a secondary winding 234-A with a conical shape embedded in block of magnetic material 232-A. Conical plug 220-A is shown in the process of engaging, via engage/disengage arrow 244, in conical socket 230-A with primary winding 225-A mated against, and in contact with, secondary winding 234-A for power transfer. As shown, misalignment 252 is overcome by the approximate coaxial location of axis 254 of the primary winding 225-A and axis

256 of mating winding, the secondary winding 234-A, wherein physical geometry, i.e., the conical nature and conformal shapes of the parts provides self-alignment. Physical pressure keeps the primary winding 225-A in place against the secondary winding 234-A during charging, due either to gravitational force, or to an exerted force by the charging equipment, e.g., hydraulic, pneumatic, electrical solenoid, etc. In one embodiment, the weight of the mating socket is sufficient pressure to keep the primary and secondary coils sufficiently close for high-efficiency energy transfer, e.g., 60% or more for traditional transformer materials, and over 80% or 90% for an amorphous metal transformer embodiment. This efficiency can be superior to traditional wireless inductive charging, and certainly less costly. In one embodiment, the electromagnetic force generated by a primary coil acts as an electromagnet that draws conical socket 230-A and conical plug 220-A together, given their ferrous body composition. With the present design, less force is required to engage the mating charger halves as compared to most other conductive plugs, which utilize an interference fit between cylindrical plugs or rectangular blades into mating receptacles. Primary and secondary coils are recessed in their respective bodies for the present embodiment. In this way, mating surfaces are straight and smooth, without protruding windings and without a ripple surface of stacked windings that might otherwise hinder a smooth insertion and engagement of the conical cone in the conical socket. Instead, insulation can fill in the gaps between wires to make a smooth conical surface. Optional Teflon or low-friction coating can be applied to both the conical plug and the conical socket to promote quick and complete seating.

Because coils 225-A and 234-A are essentially in direct contact, minus the thickness of insulation on at least one of the coils, or both of the coils, the present charger operates as a transformer, given the high ferrous content of the bodies 232-A and 223-A. Thus, the present embodiment does not require resonance frequency tuning as required by inductive charging designs. In other words, the present embodiment is resonant-frequency agnostic. Instead, the present embodiment can operate efficiently over a larger range of AC frequencies, with an operating frequency being chosen based on maximum energy transfer or other beneficial characteristics, such as noise, electromagnetic interference with other electronics, etc.

Both the conical plug and the conical socket are grounded in one embodiment. In another embodiment, individual battery packs are floating and are not at a high voltage, with faults going to the chassis, which acts as ground.

Electronics for transferring power may be attached directly in the housing (cone body 223-A or socket body 232-A) for the primary and/or secondary coil for the transformer interface to minimize the distance high frequency signals travel. More detail on electronics is provided in subsequent FIG. 5.

The shape assignment in the present embodiment describes the primary coil as an upward-facing conical plug 220-A and the secondary coil as a downward-facing conical socket. This is primarily for housekeeping purposes because foreign objects, debris, and other interfering matter do not accumulate on an upward-oriented conical socket, which sheds off debris. In a reversed orientation, however, debris would definitely accumulate, due to gravity, in an upward-oriented conical plug. However, the roles could easily be reversed for a given charging infrastructure. In one embodiment, a through hole at the apex of the conical socket to the outside, could allow small debris to fall through the apparatus entirely. In addition, one embodiment of a conical plug utilizes a rounded snub nose to prevent a sharp tip nose from hanging up on a sidewall of a conical socket during engagement.

Alignment between conical socket 230-A and conical plug 220-A can be accomplished in a wide variety of schemes with a present embodiment splitting directional alignment between socket 230-A taking fore/aft motion and alignment and plug 220-A taking lateral motion and alignment and vertical engagement. Any of these roles can be interchanged or grouped together for a given alignment and engagement protocol to ensure compatibility between all users of a protocol.

Referring now to FIGS. 2B and 2C, illustrations of mismatched but functional primary and secondary charging scenarios is shown, according to one or more embodiments. Specifically, the conical plugs and sockets can be of different sizes with one or more sets of windings so that a small, low-power charger (primary winding) can work with a larger, high-power, battery (secondary winding) as shown in FIG. 2B. Conversely, a large, high-power, charger (primary winding) can be used with a small, low power, vehicle/ battery (secondary winding) as shown in FIG. 2C. Using a fixed internal angle for the conical plug and receptacle allows this mismatch in size or quantity of primary coils or of secondary coils while continuing to provide a functional charger.

Secondary windings 234-A and 234-B1/B2 may be protected by spring-loaded doors that push aside when conical plug 220-A engages and mates with conical socket 230-A. Transformers of this type can be designed with an air-gap, so they have some tolerance of dirt and contaminant. The windings themselves are insulated but the core material is expected to be grounded (if only by contact).

Referring now to FIG. 2D, a cross-section view is shown of an oversized primary coil and an undersized secondary coil wireless charging transformer, according to one or more embodiments. In this embodiment an oversized conical plug 220-D with a nominal size primary coil 225-D1, which interfaces successfully with the interfaces with a nominal, or undersized secondary conical socket 230-D with nominal sized secondary coil 234-D. Oversized primary coil 225-D2 disposed substantially apart from 225-D1 on conical plug 220-D, has no mating secondary coil available, and no harm results from this. While a slightly lower efficiency may result from this configuration, the ability to interface with a wide range of socket sizes and power ratings, from a parallely-sized high-power socket down to a nominal, undersized socket, provides the benefit of universality with a single conical plug for a wide range of vehicle and battery pack sizes and needs.

Figures 2E, 2F:
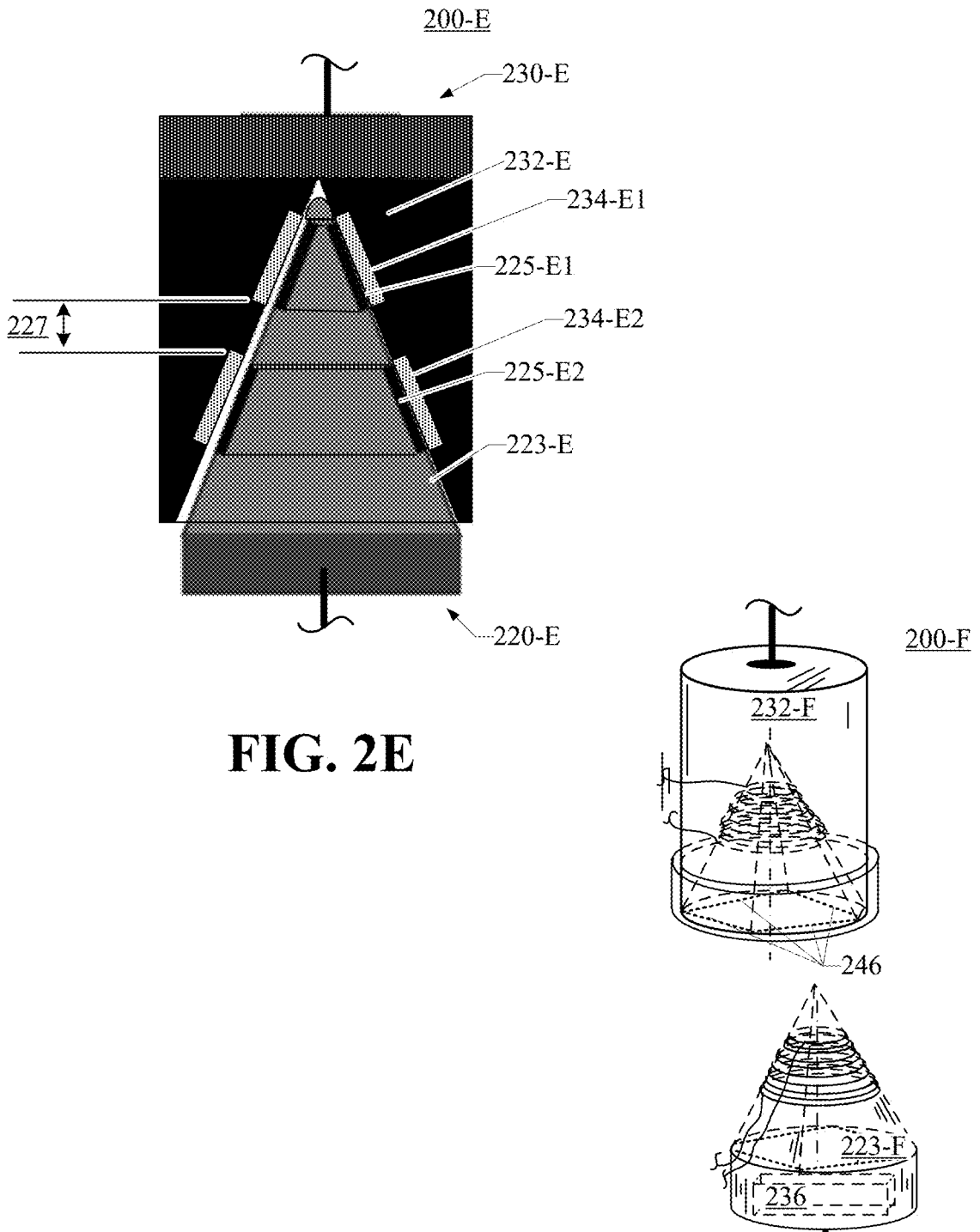
FIG. 2E is a cross-section view of a matched high-energy primary coil and a secondary coil wireless charging transformer, according to one or more embodiments.
FIG. 2F is a cross-section view of a matched high-energy primary coil and a secondary coil wireless charging transformer with a non-rotational pyramidal shape, according to one or more embodiments.

Referring now to FIG. 2E, a cross-section view is shown of a matched high-energy primary coil and a secondary coil wireless charging transformer 200-E, according to one or more embodiments. In the present embodiment, any quantity, size, amount of windings can be used for a high-energy primary and secondary coil. In one embodiment, the larger primary coil 225-E2 and secondary coil 234-E2, are sized similarly to or different from, a power capacity of the smaller primary coil 225-E1 and secondary coil 234-E1. In this manner, the increased power transfer from smaller to larger coils can be linear if sized that way, or can be substantially greater, i.e., exponential, such that both lower charging requirements are safely met, while the higher charging requirements are able to satisfy the much higher energy needs of a larger industrial application. In this embodiment, as shown in the figure, each of the two primary coils (first windings) 225-E1 and 225-E2 is paired and aligned with a respective one of the secondary coils (mating windings) 234-E1 and 234-E2. Each of the multiple primary windings (e.g., coils 225-E1 and 225-E2) and each of the secondary windings (e.g., coils 234-E1 and 234-E2) are respectively disposed separate and apart from each other a distance, as shown in the figure, of about half a length of a winding (e.g., a coil) along an axis of the core.

Referring now to FIG. 2F, a cross-section view is shown of a matched high-energy primary coil and a secondary coil wireless charging transformer with a non-rotational pyramidal shape, according to one or more embodiments. Edges 246 form the base of a four-sided pyramid, though any quantity-sided pyramid may be used. Any other shape may be used for a ferromagnetic core or shield and the associated windings so long as the pattern matches for a given charge power or scenario or application. Different non-compatible shapes are used for different charge power or scenario or application to prevent misconnection.

Figure 3A:
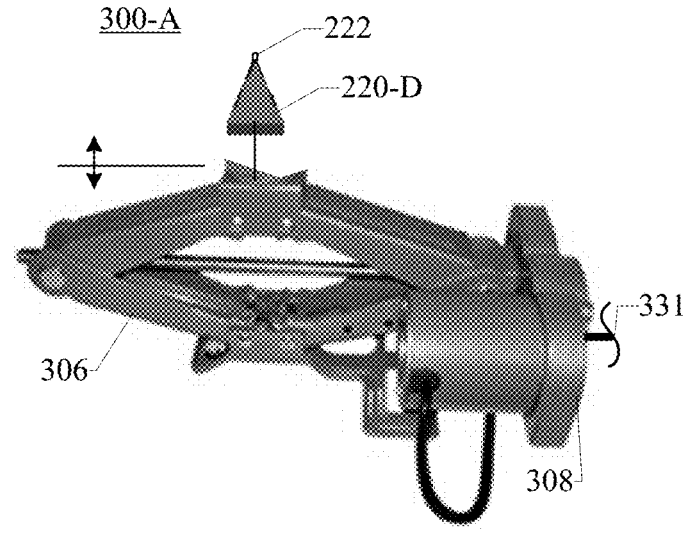
FIG. 3A is a scissor jack vertical adjustment platform for a primary coil, according to one or more embodiments.

Referring now to FIG. 3A, a charging system 300-A with a conical plug 220-D (primary assembly) is mounted on a robotic arm 308 so that it can be steered to mate with the secondary assembly on the vehicle, e.g. a vertically travelling telescopic or scissor-jack 306. Robotic arm 308 is mountable on a base robotic structure that can have one or more degrees of freedom to swing, extend, or rotate robotic arm 308 into place to mate with a charging receiver. Wired AC power 331 is provided to conical plug 220-D in this embodiment as a grid to vehicle (G2V) system. Tip 222 of conical plug 220-D is an optional LED to align with an optical sensor 221 disposed in a conical socket, as described in FIG. 2C.

Figure 3B:
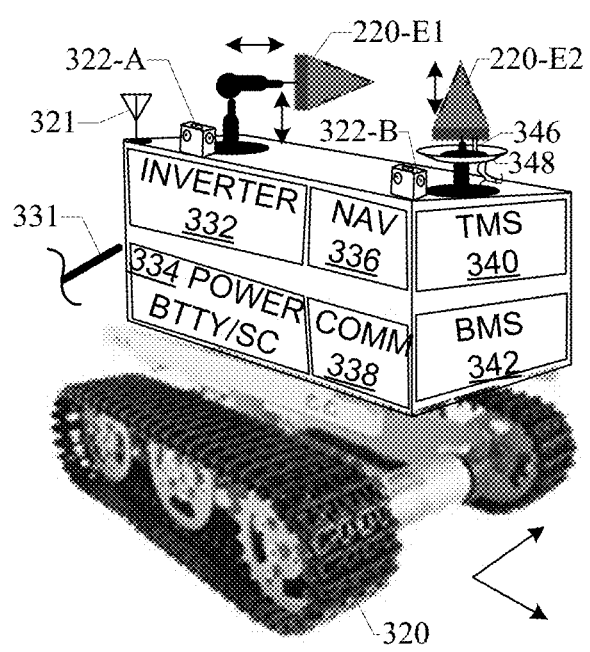
FIG. 3B is a self-propelled platform for a primary coil, according to one or more embodiments.

Referring to FIG. 3B, a self-propelled robot 300-B is shown, according to one or more embodiments. Robot assembly 300-B includes a motorized tracked chassis with a power source 334 thereon, whether tethered AC 331 or an internal DC battery and/or supercapacitor source, and one or more power control electronic modules such as inverter 332, battery management system (BMS) 342 and/or thermal management system (TMS) 340 to sense state of charge, charging cutoff time, temperature profile, and overhead conditions, etc. One or more extendible telescoping shafts with conical plugs 220-1 and 220-2 for horizontal and/or vertical coupling to, and charging of, a load such as an EV, can be extended from robot 300-B using a displacement unit based on pneumatic, hydraulic, or mechanical means such as a spooled cable rigid nylon rope, etc. Thus, a single charging source 300-B can be used to charge one or more battery packs simultaneously and in parallel on a single application, e.g., a commercial truck, or on multiple applications, e.g., on a battery pack in each of parallely-parked vehicles.

Inverter module 332 can include a switched mode power supply (DC boost converter) to increase standard DC voltage of 12 V, 24 V, or 48 V supply to a higher voltage, e.g., 110 V, which is then inverted to AC. Alternatively, DC can be inverted to AC at the given battery pack level in the robot and then use a desired-frequency transformer in the robot to create the desired AC output voltage.

In another embodiment, a vehicle to grid (V2G) bi-directional capability with energy transfer robot 300-B. In this embodiment, a rectifier and bi-directional switches are added to robot 300-B allow bi-directional current modes, and specifically, a current transfer from vehicle to robot 300-B. This would allow excess power from remote power storage units, e.g., parked EVs, to be supplied to the grid in a power outage crisis. Instead of constantly moving parked cars to access a plug, the mobile robot 300-B travels to the vehicle and after receiving a charge from a vehicle, travels to an AC source and ties into, and supplies power to, the grid. The on-board inverter 332, or an EVSE inverter, provides the inversion from DC to AC to match grid frequency and power phase.

Both robotic arm 300-A and self-propelled robot 300-B can locate the secondary assembly by various means—optically via a single reflector or pattern thereof, an LED, e.g., infrared, tracking, machine vision, cameras, RF transponders, triangulation, ultrasound positioning, global positioning system (GPS), any wireless means, provided by navigational (NAV) module 336 and optional antenna 321 and optical sensor suite 322-A and 322-B.

Cooling for transformer operation can include a liquid coolant provided by supply line 346 that flows out near a top portion of the conical surface of plug 220-E2 and is collected in a recycling pan 348 for filtering and reuse. Optional air-cooling fan (not shown) with aluminum cooling fins coupled to conical plug 220-E2 can also provide moderation of heat generated from the transformer operation.

This mobile robotic embodiment is ideal for retail parking lots or for apartment and condominium parking lots. In these applications, a parking area is separated from the building by a driveway; where power outlets billed to the user are not available; where sufficient EVSE is not available for long overnight low-rate charging; or where there are no readily accessible power outlets. The robot, in these applications, can traverse across the parking lot, from EV to power source EVSE, silently and seamlessly all night long to bring the EVs up to the desired state of charge.

Figure 3C:
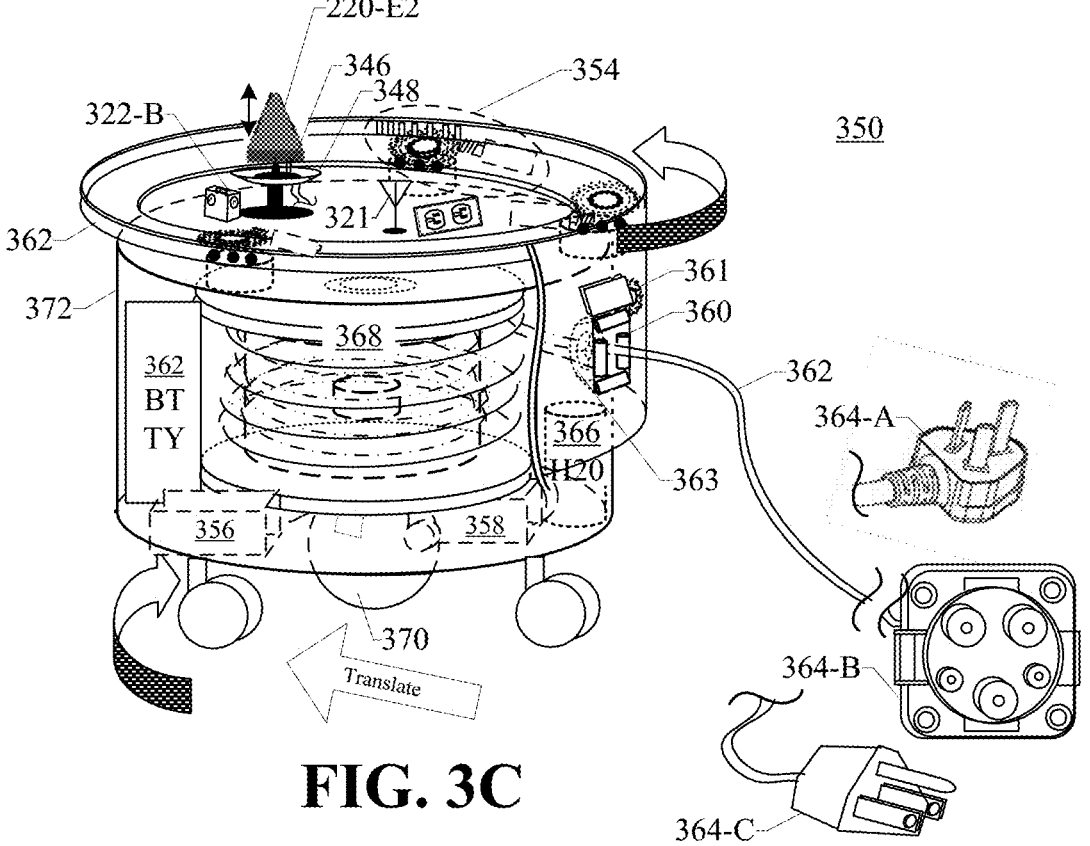
FIG. 3C is a self-propelled platform for a primary coil with brushless cord spool, according to one or more embodiments.

Referring now to FIG. 3C, a self-propelled platform 350 is shown for a primary coil with brushless cord spool, according to one or more embodiments. Spinning table 362 is driven by three or more rack (on outer edge of lip) and pinion assemblies 354. Cord spool 368 remains affixed to chassis 372, while electrical cord dispenser motor 361 and dispenser outlet and rollers 360 with tensioner 363 dispense and retract the electrical cord in a controlled fashion. Chassis 372 spins as electrical cord is dispensed or retracted. Powertrain 358 drives a roller ball 370 that provides translational motion. Powertrain motor 356 controls one or more outer wheels on chassis 372 to provide rotation of chassis. Internal battery 362 can provide cordless charging of a load, especially if grid outage occurs, or remote application does not provide a grid power source. Components are coupled to top of chassis 372 such as optional antenna 321 and optical sensor suite 322-A and 322-B. Descriptions for these components are provided in prior FIG. 3B. Multiple cord ends can include 220 V plug 364-A, 110 V plug 364-C, and EV plug in adapter 364-B to enable an EVSE stationary power unit to plug into 350 thinking it is the EV itself, which provides remote service convenience to an EV that is positioned afar from the EVSE. Cable tensioner 363 is powered by a motor such that cable can be wound tightly on the drum without having tension on the external cable which is expected to be lying loose on the floor or road surface. The motor itself may be a stepper motor for precise control of the cable feed in and out, or just a current controlled loop supply continuous tension when needed.

Figure 4:
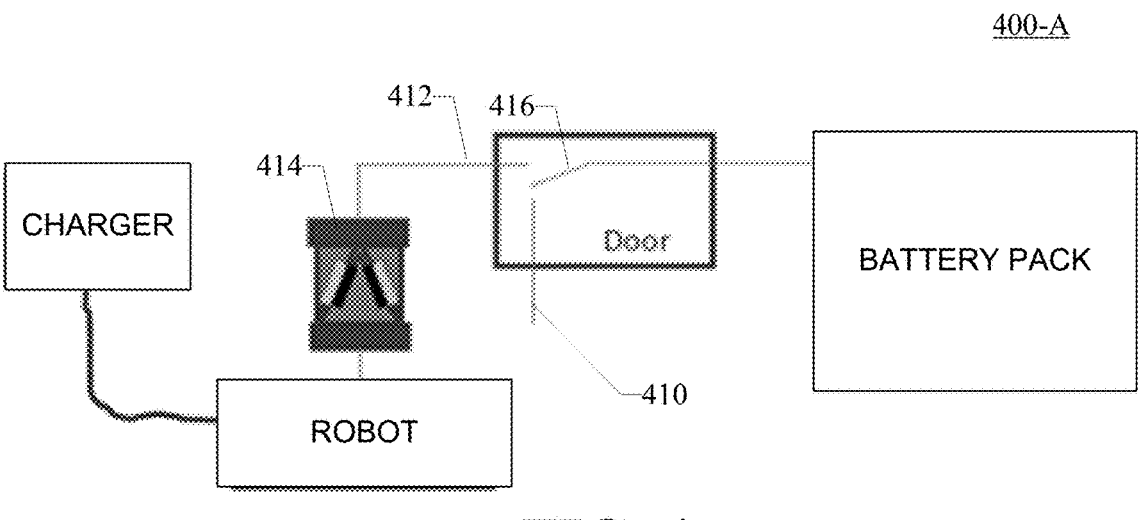
FIG. 4 is a schematic of a switch relay for multiple charging sources including a wireless charging transformer, according to one or more embodiments.

Referring now to FIG. 4, a schematic of adapting a manual and automatic charging to an EV is shown, according to one or more embodiments. The robotic charging apparatus in cars may be retrofitted by using a low profile plug attached to the charging door 416, such that when the door is closed then the standard SAE/CHAdeMO/etc. interface is connected to the transformer secondary module(s), e.g., the back of the door has a plug that connects to the robotic charging interface (conical socket), or activates a relay switch to do this. The primary side electronics would be attached to the charger by either plugging the cable into the robot (instead of the car) or equivalent connection, and power is just passed through such that the car sees the same power as a direct connection. In this manner, the system is charging exclusively from only one source: either a user manually connected EVSE charging cable via the standard SAE/CHAdeMO/etc. interface, or the robotic charging interface provides the charging. In another embodiment, piggyback power from the rectifier/transformer robotic charging interface supplements a standard SAE/CHAdeMO/etc. interface charging. In this embodiment, communication between the two systems via mobile application or locally/centrally managed service to coordinate charge, time, thermal and battery management algorithms to remain within battery pack specifications.

The primary/secondary nomenclature is for transferring power to the vehicle, but it is just nominal, power can be transferred the other way if electronics allows. Power may be transferred to the charger, which in turn can be capable of driving a home, or the grid (V2G). For large scale, fast charging the charger may have battery storage to allow buffering of energy to and from the grid, and energy may be transferred from the EV to that for later use.

In the case where there is a charger with multiple robots and multiple cars, and the power electronics is bidirectional, power may just be transferred from vehicle to vehicle, e.g. if a full large capacity EV is parked beside a smaller drained EV, the larger battery can recharge the smaller one to allow a commuter to drive home.

A vehicle may have multiple secondary units in different locations (even if there is only one battery pack), e.g. on the front and back bumpers so that it can share power where a lateral connection is preferred, e.g. wall-mounted chargers in front of the EV, or EV-to-EV in convoy scenarios.

For connecting front or back mounted units the robotic behavior may be split such that the EV end has the (telescopic) extension and some vertical movement (angle up/down) and the (wall mounted) end has some lateral movement (e.g. can move on a rail).

The fast charger itself can be a robot (with on-board storage), so that it can wander through car parks charging and refueling as necessary, it can have multiple attached subordinate robots for connecting to EVs. It may also connect to other vehicles like hybrids or trucks that can burn fuel (like biodiesel or Hydrogen) to be recharged, or for charging adjacent EVs, and similarly may have an on-board generation capability in addition to batteries.

Carparks, or parking lots and structures, with solar canopies may have robots attached that just funnel power into any parked EVs rather than connecting to the grid. This is a desirable scenario to avoid "duck curve" issues with over-generation.

The present embodiment does not use the link, or coupling, between the batteries for charging them. Rather, each battery is isolated and independently charged by itself, with local connections thereto that are tied into the mobile and/or alignable charging devices that are individually tied to a single battery pack, or portion thereof that has independent leads tied only to that portion of the battery pack. The present embodiment uses thicker pipes locally with separate input into each btty pack—not the usual serial charging through multiple or all the battery packs.

Figure 5A:
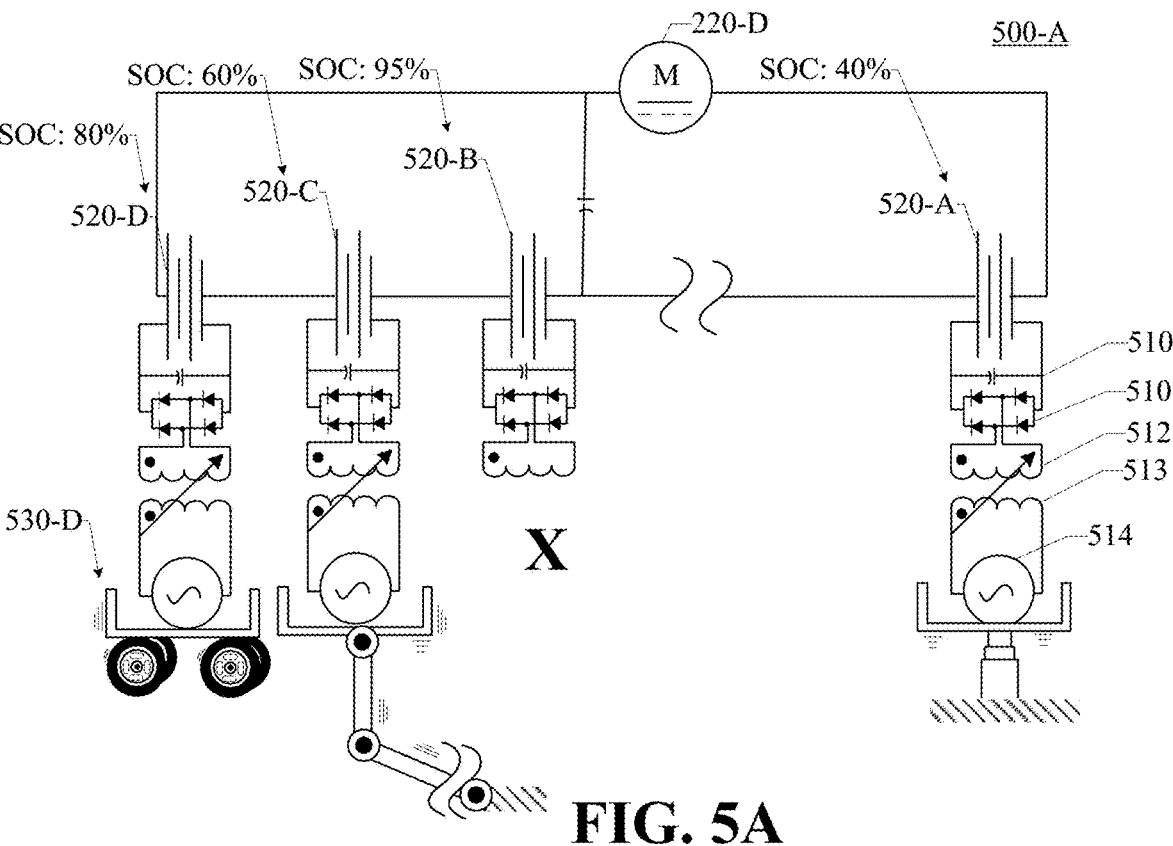
FIG. 5A is a schematic of multiple wireless alignable charging transformer interfaces, each individually charging a respectively paired battery pack, according to one or more embodiments.

Referring now to FIG. 5A, an electrical schematic is shown of multiple wireless charging transformer interfaces, each individually charging a respectively paired battery pack, according to one or more embodiments. Each battery charging interface 520-A through 520-D comprises a full-wave rectifier 510 (or alternatively a half-wave rectifier), comprised of diodes or any other type of current direction controlling device. Secondary coil 512 mates up with primary coil 513, with the arrow indicating different sizes of interfaces that can transfer more or less power, as shown in FIGS. 2B-2E. Notably battery pack 520-D has a beginning SoC of 80% while battery pack 520-C has a SoC of 60%, both of which need charging. However, battery pack 520-B is 95% charged, and thus is sufficiently charged and does not need to consume any additional charging resources, unless all battery packs are at that state of charge and they desire to be topped off. AC source 514 can be inverted power supplied from DC batteries and/or super capacitors. Time division multiplexing shares automatic, robotic power sources 530-A through 530-D, between battery packs. While battery packs 520-A through 520-D are in illustrated in series to reach a high traction voltage, if one or more battery packs are coupled in parallel, then connection can be shared across packs if there are fewer robots than packs (to avoid stressing individual packs). Several examples of robotic power sources are illustrated in FIGS. 3A and 3B.

Figure 5B:
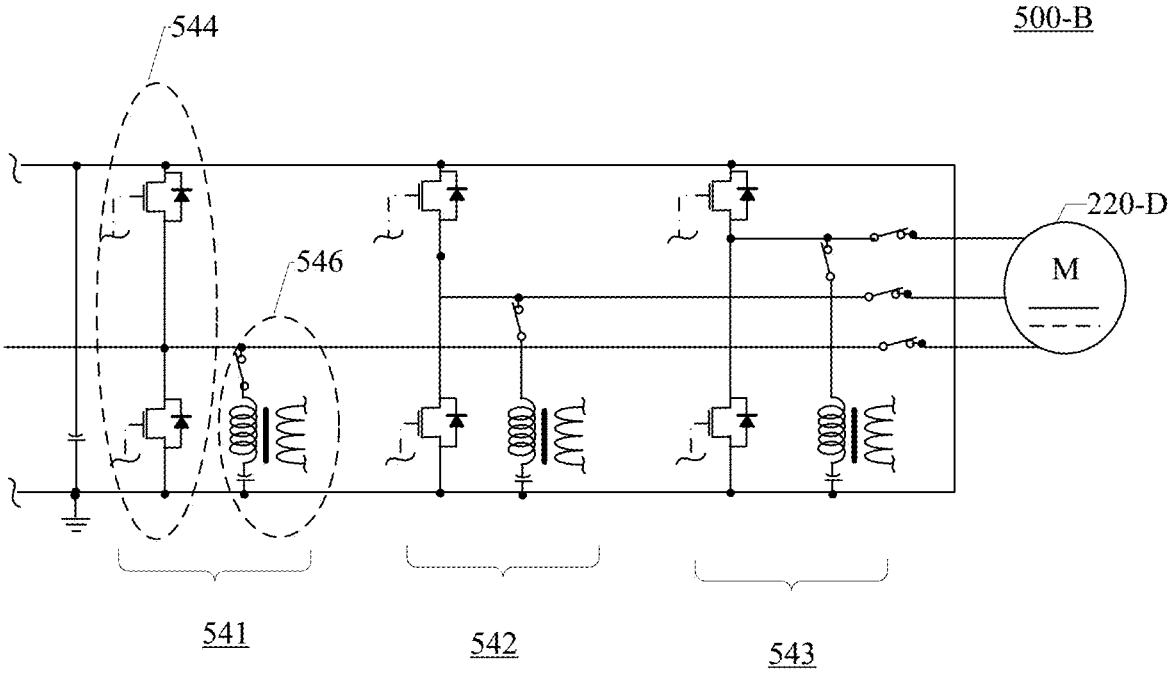
FIG. 5B is a schematic of an EV motor drive, whose power electronics can be repurposed to drive a primary transformer for V2G, according to one or more embodiments.

Referring now to FIG. 5B, a schematic is shown of an EV motor drive, whose power electronics can be repurposed to drive a primary transformer for V2G, according to one or more embodiments. This configuration utilizes the EV's own motor drive power electronics to power the windings on the robot's transformer connection, which now act as a primary winding. Thus, the present disclosure operates as a bidirectional energy transfer system, for little extra cost. Additionally using the phase drives independently allows driving separate transformers on each phase. An alternative configuration using a delta configuration of the transformers would permit operation without the capacitors.

Cooling/Cleaning

High-powered fast charging can be efficient, but at 100 kW, there may easily be 1 kW (1%) lost in the transformer connection, and the same again in the power electronics. This inefficiency mostly translates to heat, which translates to a need for cooling. Active cooling the transformer can be achieved by running coolant, e.g., water, sourced from the primary conical plug through the middle of the body housing the active coil such that it flows back through the gap between the primary and secondary coils (between the conical plug and conical socket). Gravity will pull the coolant back down to the robot chassis where it can be caught and recycled. The robot can find its way to a water source to resupply with water if needed. This method of cooling doubles as a cleaning mechanism. The fluid may be a composition, or include additives, engineered for the task, e.g. anti-corrosives, etc. Grooves or some conduit in the interfacing surfaces of one or both of the conical plug or conical socket provides a flow path for fluid in the form of gas or liquid to escape from the transformer. Alternatively, passive cooling such as aluminum cooling fins, with optional active cooling fan for air convection cooling, on exposed surfaces (other than the interfacing surfaces) of conical plug and/or the conical socket.

Communication

If infrared lasers are used as the locating mechanism, they may double as a communication channel, with robot/secondary communication also being line-of-sight. IR lasers would be located at the center of the primary/secondary assemblies to be in close proximity when mated. Otherwise, traditional means of communication including cellular, WiFi, Zigbee, Bluetooth, etc. are usable to monitor status of equipment, schedule charging, and place orders for charging and billing.

Operations

Figure 6:
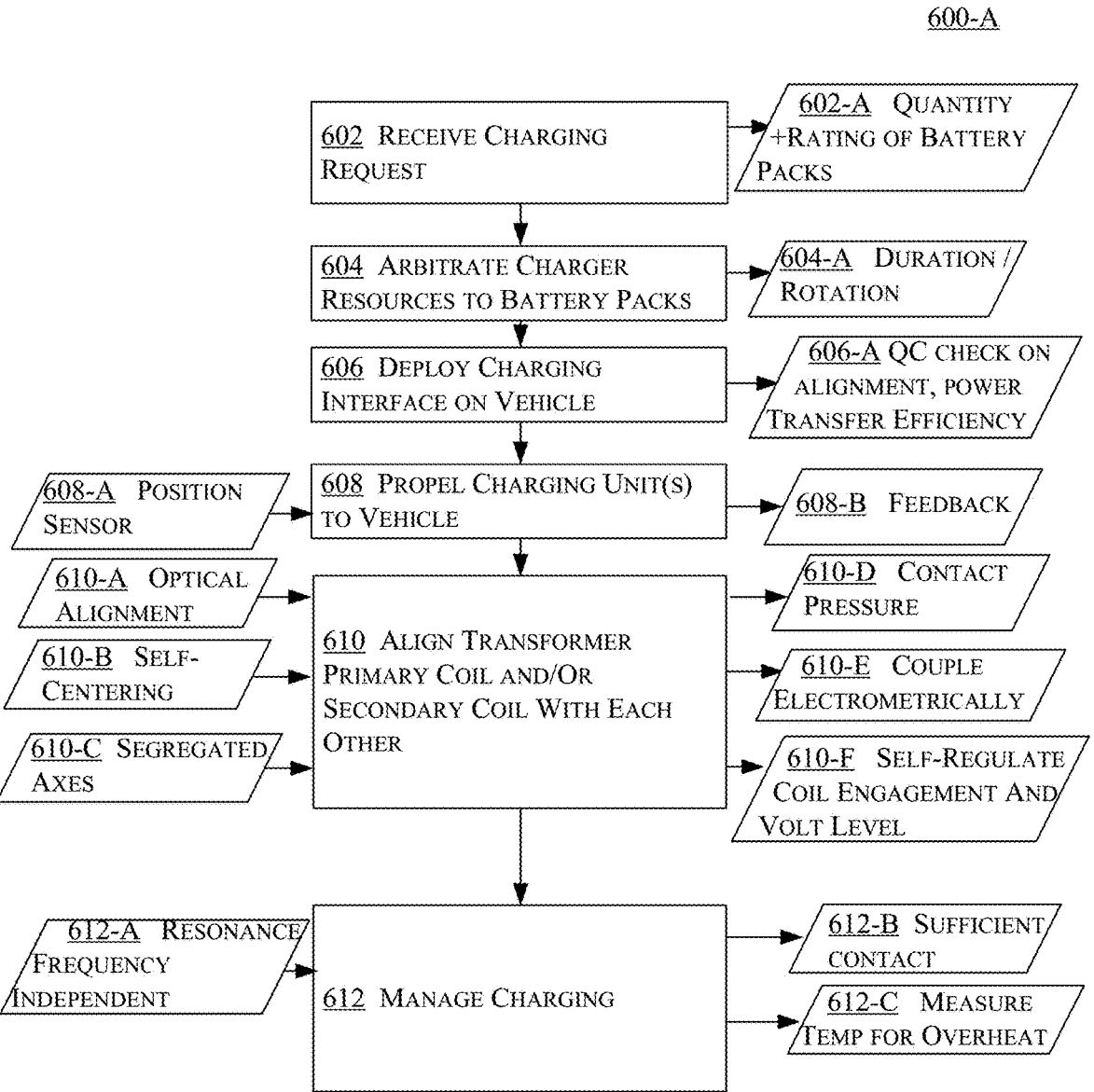
FIG. 6 is a flowchart of a method for scalably and wirelessly transformer power transfer that is independent of resonant frequency, according to one or more embodiments.

Referring now to FIG. 6, a flowchart 600-A is shown of a method for scalably and wirelessly transformer power transfer that is independent of resonant frequency, according to one or more embodiments. In one embodiment, process 400 is implemented by the apparatus and applications illustrated in FIGS. 1A-5.

Operation 602 receives a charging request, from a mobile app, the cloud, or an interfacing EV service equipment kiosk, user interface panel. Output 602-A provides a quantity and rating of battery packs for a user's given application to be charged. This can be either a wireless ID, an RFID, a bar code a QR code, or any other identification means.

Operation 604 arbitrates charger resources to battery packs. An output of 604-A determines the duration and rotation of the charger resources. For example, if twice the demand of batteries to be charged exists for the supply of chargers, then the chargers can operate at a 50% duty cycle for a given charge period or duration to charge an evenly beginning state of charge (SoC) set of battery packs to an approximately equal ending state of charge. Alternatively, if battery packs or individual chargeable portions thereof, have unequal beginning state of charge, then the arbitrator will distribute the duration and rotation such that the lowest SoC batter receives the longest and highest power charger, while the higher beginning SoC battery packs will receiver shorter duration and will have the chargers rotate more frequently. In this manner time division multiplexing across multiple battery packs is achieved. This also provides time for surface charge or high charge C rate inputs to dissipate through the balance of the battery, thereby reducing the stress on the cathode, prevent lithium-plating on the anode (for Li-Ion battery), and maintain a reasonable battery temperature (avoid overheating). The mobile robot provides this ability that otherwise is not available with a manual plug operation.

Operation 606 deploys a charging interface on vehicle. The charging interface on the vehicle is the secondary winding portion of the transformer interface. The charging interface can be static and fixed on the application, e.g., the EV, or it can be recessed and dynamic or extendible, e.g., as protected by an access panel. Other features of the charging interface include a location function, including either active output such as wireless signal, ultrasonic signal, etc., or a passive locator such as an optically reflective surface that provides directionality to a wheeled robotic unit, or a robotic arm, or etc. Several charging interface embodiments are illustrated and described in FIGS. 1B and 1C. Most applications will have multiple charging interfaces as shown in the aforementioned figures and in FIG. 5. Output 606-A provides a quality control (QC) check on alignment and power transfer efficiency, e.g., leakage current detection, etc. A feedback system monitoring the SoC can provide an indication of power transfer efficiency. If a slower than expected SoC rise exists, the interface can be retracted and redeployed and/or a replacement charging supply unit can be swapped out. The load application, e.g., an EV, either can be static (parked) or it can be dynamic (traveling). Charging interfaces that become exposed or extended during transit are shown in FIG. 1B, such as the charging interface disposed in the front and back bumper of the EV.

Operation 608 propels, moves, or aligns the charging unit(s) to the load, e.g., the vehicle. As shown in FIGS. 3A, 3B, and 5, any embodiment that provides some kind of motion or travel is useful in automatically bringing the charging unit primary coil in aligned proximity to the mating charging interface on the load. As an input, 608-A, one or more position sensors are utilized to achieve said alignment as mentioned for FIG. 3B. As output 608-B provides feedback to a control mechanism of the propelling, or locomotion, to direct the location apparatus, whether robotic arm, self-propelled energy source, etc.

Operation 610 aligns transformer primary coil and/or secondary coil with each other. Since the primary and secondary coils are geometrically self-centering conical shapes, both convex and concave, and with the aid of gravitational weight for the vertically extending interfaces, the flexibility and robustness of the system for nominal errors in alignment is improved over other designs. With the present embodiment, positioning the primary and secondary coils within 2.5 mm, 5.0 mm, or even 10 mm or more is sufficiently accurate to allow the self-centering aspect to compensate for the remaining misalignment to allow the conical coils to seat sufficiently as to have surface contact between each other. Other features such as a flexible cord, multiple jointed robotic arm, enable an operation of vibration or wiggling a conical plug so that it seats properly and finds its center in the conical socket. Optional lubricant added to the conical plug also aids in a smooth and fully seated interface between conical plug and conical socket. This operation can use optical alignment 610-A, self-centering 610-B, and segregated axes 610-C. The output results include contact pressure 610-D, coupling electromagnetically 610-E, and self-regulated coil engagement and voltage level 610-F.

Operation 612 manages charging per OEM EV and GRID needs and capabilities. Input includes resonance frequency independence 612-A with the inductive charging, and output of sufficient contact 612-B and measurement of temperature for overheating 612-C.

Alternatives:

In the claims, any reference signs placed between parentheses shall not be construed as limiting the claim. The word 'comprising' does not exclude the presence of other elements or steps then those listed in a claim. Furthermore, the terms "a" or "an," as used herein, are defined as "one, or more than one." Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are arbitrarily used to distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

As used throughout this application, the word "may" or "can" is used in a permissive sense (i.e., meaning having the potential or ability to do something), rather than the mandatory sense (i.e., meaning must). Similarly, the words "include," "including," and "includes" mean "including, but not limited to" the listed item(s).

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

Unless specifically stated otherwise as apparent from the foregoing discussions, it is appreciated that throughout the present description of embodiments, discussions utilizing terms such as "receiving", "charging", "arbitrating", "deploying", "propelling", "aligning", "managing" "transmitting", "operating," "communicating," "executing," "replacing," or the like, refer to the actions and processes of an integrated circuit, an ASIC, a memory device, a computer system, or similar electronic computing device. The memory device or similar electronic computing device manipulates and transforms data represented as physical (electronic) quantities within the devices' registers and memories into other data similarly represented as physical quantities within the devices' memories or registers or other such information storage, transmission, or display devices.

Methods and operations described herein can be in different sequences than the exemplary ones described herein, e.g., in a different order. Thus, one or more additional new operations may be inserted within the existing operations or one or more operations may be abbreviated or eliminated, according to a given application.

Other features of the present embodiments will be apparent from the accompanying drawings and from the detailed description. In addition, it will be appreciated that processors, and electrical user interface controls, under the control of computer readable and computer executable instructions stored on a computer-usable storage medium, may carry out, the various operations, processes, and methods disclosed herein at least in part. The computer readable and computer executable instructions reside, for example, in data storage features such as computer usable volatile and non-volatile memory and are non-transitory. However, the non-transitory computer readable and computer executable instructions may reside in any type of computer-usable storage medium.

The foregoing descriptions of specific embodiments of the present disclosure have been presented for purposes of illustration and description. They are not intended to be exhaustive or to limit the invention to the precise forms disclosed. Many modifications and variations are possible in light of the above teaching without departing from the broader spirit and scope of the various embodiments. The embodiments were chosen and described in order to explain the principles of the invention and its practical application best and thereby to enable others skilled in the art to best utilize the invention and various embodiments with various modifications as are suited to the particular use contemplated. It should be appreciated that embodiments, as described herein, can be utilized or implemented alone or in combination with one another. While the present disclosure has been described in particular embodiments, it should be appreciated that the present invention should not be construed as limited by such embodiments, but rather construed according to the claims appended hereto and their equivalents. The present invention is defined by the features of the appended claims.

US 12,589,663 B2

15

I claim:

1. An electrical charging unit for a wireless transfer of energy, the electrical charging unit comprising:

one or more first windings mateable with one or more mating windings for the wireless transfer of energy between the one or more first windings and the one or more mating windings;

a first ferromagnetic core around which the one or more first windings are disposed; and wherein:

the one or more first windings are not conductively coupleable to the one or more mating windings;

the one or more first windings are not required to be disposed in a plane;

the one or more first windings function as primary windings to source energy;

the one or more first windings are one-half of a transformer that is selectively separable from the one or more mating windings between charging operations;

each of the one or more first windings are disposed separate and apart from each other along an axis of the first ferromagnetic core a distance of about half of a length of one of the plurality of first windings; and the one or more first windings comprise a shape that is nestable with the one or more mating windings.

2. The electrical charging unit of claim 1, wherein:

an internal angle formed by a shape of all the one or more first windings is greater than 0 degrees and less than 180 degrees; and each of two of the one or more first windings respectively aligns with each of two of the one or more mating windings.

3. The electrical charging unit of claim 1, further comprising:

a plurality of first windings, for a respective plurality of transformer halves; and wherein:

the one or more first windings form a pyramid shape.

4. The electrical charging unit of claim 1, wherein:

the one or more first windings are wound externally or internally around the first ferromagnetic core; and the one or more first windings are recessed in the first ferromagnetic core such that a mating surface is straight and smooth.

5. The electrical charging unit of claim 1, wherein:

a resonance frequency tuning of the one or more first windings to the one or more mating windings for transformer charging is not required.

6. The electrical charging unit of claim 1, wherein:

the one or more mating windings comprise a plurality of second windings; and a ferromagnetic shield disposed externally on one side of the plurality of second windings; and wherein:

each of the plurality of second windings is respectively mated with only one of the one or more first windings, regardless of a quantity of first windings; and the plurality of second windings is disposed separate and apart from each other along an axis of the first ferromagnetic core by a distance of approximately half of a length of one of the plurality of second windings.

7. The electrical charging unit of claim 6, wherein:

the one or more first windings are wound around an outside of the first ferromagnetic core; and

the one or more mating windings are wound around an inside of the ferromagnetic shield having a conical socket shape;

the mating windings are recessed in the ferromagnetic shield such that a mating surface is straight and smooth.

8. The electrical charging unit of claim 6, wherein:

the one or more first windings are mechanically self-aligning with the one or more second windings disposed on a conical and conformal shape; and at least one of a conical plug or a conical socket further comprises a low-friction coating disposed thereon to promote quick and complete seating between the conical plug and the conical socket.

9. The electrical charging unit of claim 8, wherein:

the one or more first windings are bounded by an internal ferromagnetic conical plug and by an external ferromagnetic conical socket that are disposed along an aligned axis of the one or more first windings and the one or more mating windings; and at least one of the one or more first windings and the respective second windings further comprise a thickness of insulation that fills the gaps between wires in the first or second windings, resulting in the first windings and second windings essentially being in direct, but not conductive, contact.

10. The electrical charging unit of claim 1, wherein:

the one or more first windings disposed on the first ferromagnetic core are configurable as a primary winding function or a secondary winding function; and the one or more mating windings are configurable as a complementary winding function to the one or more first windings in order to provide bidirectional energy transfer.

11. The electrical charging unit of claim 1, wherein:

the first ferromagnetic core is comprised of:

a ferrous material suitable for an AC frequency less than 100 Hz.

12. The electrical charging unit of claim 1, further comprising:

an inductor and a capacitor coupled to the one or more first windings to perform a resonant transformer operation.

13. The electrical charging unit of claim 1, further comprising:

an optical source disposed proximate to the first ferromagnetic core;

an optical sensor disposed proximate to a ferromagnetic shield; and wherein:

the optical source and the optical sensor providing alignment for charging.

14. An autonomous electrical charging system comprising:

a chassis;

a plurality of wheels coupled to the chassis to enable the chassis to spin;

a powertrain coupled to the chassis; and a brushless dispensing unit, coupled to the chassis, for dispensing and retracting an electrical cord;

an electrical charging unit for a wireless transfer of energy, the charging unit further comprising:

one or more first windings mateable with another winding for wirelessly transferring energy between the one or more first windings and the another winding;

a first ferromagnetic core around which the one or more first windings are disposed; and wherein:

the one or more first windings are not conductively coupleable to the another winding; and the one or more first windings are not disposed in a plane;

each of the one or more first windings are disposed separate and apart from each other along an axis of the first ferromagnetic core a distance of approximately half of a length of one of the plurality of first windings; and the chassis is configured to spin to dispense the electrical cord from the brushless dispensing unit.

15. The autonomous electrical charging system of claim 14, further comprising:

a local battery pack; and an inverter coupled to the local battery pack for driving the one or more first windings in the electrical charging unit.

16. The autonomous electrical charging system of claim 14, further comprising:

a cable guide coupled to the chassis to deploy the electrical cord while the chassis travels to a load to be charged; wherein the cable guide further comprises:

a dispenser motor; and a dispenser outlet coupled to the dispenser motor.

17. The autonomous electrical charging system of claim 14, wherein:

the one or more first windings are interfaceable with a plurality of different turns ratios set by the one or more secondary windings for charging different power levels.

18. The autonomous electrical charging system of claim 14, further comprising:

a liquid coolant system to pump a liquid coolant to at least one of the one or more first windings and the first ferromagnetic core.

19. The autonomous electrical charging system of claim 14, further comprising:

a motor drive electronic circuit coupleable to the electrical charging unit; and wherein:

the motor drive electronic circuit is reconfigured to supply power to the one or more primary windings of the electrical charging system.

20. The autonomous electrical charging system of claim 14, further comprising:

a plug, around which the one or more first windings are disposed;

a socket, around which the one or more mating windings are disposed; and wherein:

a quantity of first windings on the plug that are disposed separate and apart from each other is not required to match a quantity of mating windings on the socket that are disposed separate and apart from each other.

21. The autonomous electrical charging system of claim 20, wherein:

the quantity of first windings on the plug, disposed separate and apart from each other, is a different quantity than the quantity of the mating windings on the socket, disposed separate and apart from each other; and the power transferred between the plug and the socket is automatically determined by a given quantity of first windings existing on the plug that is physically matched, oversized or undersized than the socket that pair with a same given quantity of mating windings on the socket.

22. A method of wirelessly transferring energy from an electrical charging unit to a load, the method comprising:

traversing either the one or more first windings or the one or more mating windings to proximate location with each other;

coaxially self-aligning an axis of the one or more first windings with an axis of the one or more mating windings from a conical and conformal shape; and longitudinally self-aligning the one or more first windings with the one or more mating windings along approximately coaxially self-aligned axes of the one or more first windings and the one or more mating windings; and the power transferred between a plug and a socket is automatically determined by a quantity of first windings on the plug that align with a quantity of secondary windings that exist on the socket.

23. The method of claim 22, further comprising:

engaging a variable quantity of the one or more first windings that are disposed separate and apart from each other with the one or more mating windings that are disposed separate and apart from each other to create a variable power level of charging.

24. The method of claim 22, wherein:

brushes are not required to transfer power from the electrical cord to the one or more first windings; and a chassis of the electrical charging unit is configured to spin to dispense the electrical cord from a brushless dispensing unit.

25. The method of claim 22, wherein:

the one or more first windings and the one or more mating windings are configurable to operate in a resonant transformer mode and in a non-resonant transformer mode.

26. An autonomous electrical charging infrastructure comprising:

a plurality of electrical charging units for a wireless transfer of energy, wherein each of the electrical charging units further comprises:

a battery;

one or more first windings mateable with another winding, and seated sufficiently as to have surface contact between each other for wirelessly transferring energy between the one or more first windings and the another winding; and a first ferromagnetic core around which the one or more first windings are disposed; and wherein:

the one or more first windings are not conductively coupleable to the another winding;

the one or more first windings are not required to be disposed in a plane;

the chassis is configured to spin to dispense the electrical cord from the brushless dispensing unit; and two or more of the plurality of electrical charging units individually charge in parallel a respectively paired battery pack of a given application.

* * * * *